(12) United States Patent
Atarashi et al.

(10) Patent No.: US 7,548,038 B2
(45) Date of Patent: Jun. 16, 2009

(54) CONTROLLER FOR MOTOR

(75) Inventors: Hirofumi Atarashi, Wako (JP);
Hiroyuki Isegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 11/723,586

(22) Filed: Mar. 21, 2007

(65) Prior Publication Data
US 2007/0222406 A1    Sep. 27, 2007

(30) Foreign Application Priority Data
Mar. 22, 2006    (JP) .............................. 2006-078553

(51) Int. Cl.
*H02P 21/00*    (2006.01)

(52) U.S. Cl. ..................... 318/494; 318/801; 318/809; 318/810; 318/811; 318/812

(58) Field of Classification Search ................. 318/494, 318/801, 809, 810, 811, 812
See application file for complete search history.

(56) References Cited

U.S. PATENT DOCUMENTS

| 4,305,031 | A |   | 12/1981 | Wharton |   |
|---|---|---|---|---|---|
| 5,245,238 | A |   | 9/1993 | Lynch et al. |   |
| 5,543,943 | A | * | 8/1996 | Hanyu et al. | 349/20 |
| 6,376,955 | B1 | * | 4/2002 | Arimitsu | 310/114 |
| 6,563,246 | B1 |   | 5/2003 | Kajiura et al. |   |
| 6,774,591 | B2 | * | 8/2004 | Arimitsu et al. | 318/154 |
| 6,879,125 | B2 | * | 4/2005 | Akatsu | 318/495 |
| 2003/0062784 | A1 | * | 4/2003 | Arimitsu et al. | 310/112 |

FOREIGN PATENT DOCUMENTS

JP    2002-204541 A    7/2002

* cited by examiner

*Primary Examiner*—Rita Leykin
(74) *Attorney, Agent, or Firm*—Arent Fox LLP.

(57) ABSTRACT

A controller for a motor is capable of reducing the amount of energization required to operate a motor under a predetermined condition, the motor having two rotors disposed around a rotating shaft. The controller includes an induced voltage constant command value determiner which determines an induced voltage constant command value (Ke_c) of a motor such that a difference (ΔVp) between a target voltage circle radius (Vp_target) and a magnitude (Vp) of the vector sum of a d-axis voltage command value and a q-axis voltage command value of the motor decreases, a rotor phase difference acquirer and a rotor phase difference command value determiner which change a rotor phase difference on the basis of the Ke_c, and a field weakening current correction value calculator which determines a field weakening correction current ΔId_vol on the basis of ΔVp and adds the determined ΔId_vol to the d-axis current command value in the case where Vp cannot be reduced to Vp_target or less by reducing Ke_c to a lower limit of a rotor phase difference changing range.

14 Claims, 12 Drawing Sheets

US 7,548,038 B2

CONTROLLER FOR MOTOR

BACKGROUND OF THE INVENTION

1. Field of the Invention

The present invention relates to a controller for a motor adapted to carry out field weakening control of a permanent magnet field type rotary motor by changing a phase difference between two rotors disposed around a rotating shaft.

2. Description of the Related Art

Hitherto, there has been known a permanent magnet field type rotary motor which is equipped with a first rotor and a second rotor concentrically provided around a rotating shaft thereof and which is adapted to conduct field weakening control by changing a phase difference between the first rotor and the second rotor according to a rotational velocity (refer to, for example, Japanese Patent Laid-Open Publication No. 2002-204541).

In such a conventional motor, the first rotor and the second rotor are connected through the intermediary of a member that is displaced in the radial direction when subjected to a centrifugal force. The motor is configured such that, when the motor is in a halting state, the magnetic poles of the permanent magnets disposed in the first rotor and the magnetic poles of the permanent magnets disposed in the second rotor are oriented in the same direction, providing a maximum magnetic flux of the field, while the phase difference between the first rotor and the second rotor increases due to a centrifugal force as the rotational velocity of the motor increases, thus reducing the magnetic fluxes of the field.

FIG. 12 shows a range in which the field of the motor need to be weakened. In the figure, the axis of ordinates indicates output torque Tr and the axis of abscissas indicates the number of revolutions N. The character "u" in the figure denotes an orthogonal line of the motor. The line u is formed by connecting points at which a phase voltage of the motor becomes equal to a supply voltage, depending on a combination of the number of revolutions and an output torque when the motor is actuated without carrying out the field weakening control. The character X in the figure denotes a range in which the field is not required to be weakened, while Y denotes a range in which the field is required to be weakened.

As shown in FIG. 12, the range Y in which the field need to be weakened is determined by the number of revolutions N and the output torque Tr of the motor. Hence, the conventional control for weakening the field, which depends merely on the number of revolutions, tends to inconveniently result in an excessive or insufficient control amount for weakening the field.

Basically, the field weakening control is intended to reduce a back electromotive force produced in an armature by the revolution of the motor so as to restrain a voltage between terminals of the armature from becoming higher than a supply voltage, thereby allowing the motor to be used in a higher revolution range. When changing the phase difference between the first rotor and the second rotor by the number of revolutions of the motor or a centrifugal force, only the number of revolutions is the parameter for changing the level of field weakening. This inconveniently prevents flexible changes of the controllable range of output torque or the number of revolutions of the motor.

Furthermore, in a motor that operates also as a generator, the operating efficiency is generally improved by using different field control amounts for a driving mode (positive output torque) and a power generating mode (negative output torque), respectively, for the same number of revolutions. Furthermore, when changing the phase difference between the first rotor and the second rotor by the number of revolutions or a centrifugal force, it is disadvantageous that the field control amount cannot be changed between the driving mode and the power generating mode.

SUMMARY OF THE INVENTION

The present invention has been made with a view of the aforesaid background, and it is an object of the invention to provide a controller for a motor that is capable of reducing the amount of energization required to actuate, under a predetermined condition, a motor having two rotors that are concentrically disposed.

To this end, according to the present invention, there is provided a controller for a motor adapted to control an operation of a permanent magnet field type rotary motor having a first rotor and a second rotor, which have a plurality of fields made of permanent magnets and which are disposed around a rotating shaft, by field control carried out by changing a rotor phase difference as the phase difference between the first rotor and the second rotor. The field control includes field weakening control for reducing the magnetic fluxes of the fields of the motor and field strengthening control for increasing the magnetic fluxes of the fields of the motor.

A controller for a motor according to a first aspect of the present invention includes: an inverter circuit for converting DC power supplied from a DC power source into multiphase AC power to be supplied to an armature of the motor; a rotor phase difference command value determiner for determining a command value of the rotor phase difference in a direction in which a magnetic flux of a field of the motor increases in the case where the magnitude of a resultant vector of voltages between terminals of armatures of phases of the motor is smaller than a target voltage that has been set to be not more than an output voltage of the DC power source; and a rotor phase difference changer for changing the rotor phase difference on the basis of the command value of the rotor phase difference.

With this arrangement, in the case where the magnitude of a resultant vector of voltages between terminals of armatures of individual phases of the motor is smaller than a target voltage that has been set to be not more than an output voltage of the DC power source, then a command value of the rotor phase difference is determined by the rotor phase difference command value determiner in a direction in which magnetic fluxes of a field of the motor increase. Further, the rotor phase difference is changed by the rotor phase difference changer on the basis of the command value of the rotor phase difference. In this case, the magnetic fluxes of a field of the motor are increased so as to reduce the amount of energization required for outputting a torque of a predetermined level from the motor. This makes it possible to reduce the current to be supplied to the motor to generate the torque.

A controller for a motor according to a second aspect of the present invention includes: an inverter circuit for converting DC power supplied from a DC power source into multiphase AC power to be supplied to an armature of the motor; a rotor phase difference command value determiner for determining a command value of the rotor phase difference in a direction in which magnetic fluxes of a field of the motor decrease in the case where the magnitude of a resultant vector of voltages between terminals of armatures of individual phases of the motor is larger than a target voltage that has been set to be not more than an output voltage of the DC power source; and a rotor phase difference changer for changing the rotor phase difference on the basis of a command value of the rotor phase difference.

With this arrangement, in the case where the magnitude of a resultant vector of voltages between terminals of armatures of individual phases of the motor is larger than a target voltage that has been set to be not more than an output voltage of the DC power source, then a command value of the rotor phase difference is determined by the rotor phase difference command value determiner in a direction in which magnetic fluxes of a field of the motor decrease. Further, the rotor phase difference is changed by the rotor phase difference changer on the basis of a command value of the rotor phase difference. In this case, the magnetic fluxes of a field of the motor are decreased so as to reduce an induced voltage generated when the motor is run at a predetermined number of revolutions, thus making it possible to reduce the current to be supplied to the motor to weaken the field.

Preferably, the controller for a motor in accordance with the present invention includes a rotor position detector for detecting a position of the first rotor; an energization controller for carrying out energization control of the motor by converting the motor into an equivalent circuit based on a two-phase DC rotating coordinate system composed of a d-axis in the direction of a magnetic flux of a field of the motor and a q-axis, which is orthogonal to the d-axis, on the basis of a position of the first rotor, and by controlling the amount of energization of an armature on each axis in the equivalent circuit; a current detector for detecting a current flowing through an armature of the motor; an angular velocity detector for detecting an angular velocity of the motor; a rotor phase difference estimator for estimating the rotor phase difference on the basis of conversion values in the equivalent circuit of the voltages between the terminals of the armatures of the motor and currents flowing through the armatures and an angular velocity of the motor; and a current command value determiner for determining a command value of the amount of energization of the armature disposed on the d-axis of the equivalent circuit and a command value of the amount of energization of the armature disposed on the q-axis in energization control of the motor by the energization controller on the basis of an estimated value of the rotor phase difference estimated by the rotor phase difference estimator and a command value of an output torque of the motor.

With this arrangement, in the case where a rotor phase difference of the motor is changed with a resultant change in the magnetic fluxes of a field, then the amount of energization required for outputting a predetermined torque from the motor changes accordingly. Hence, the current command value determiner determines the command values of the amounts of energization of the armature disposed on the d-axis and the armature disposed on the q-axis, respectively, on the basis of the estimated value of the rotor phase difference of the motor by the rotor phase difference estimator and the command value of the output torque. This makes it possible to set command values of appropriate amounts of energization for a particular state of fields of the motor that has changed according to a rotor phase difference.

Preferably, the controller for a motor includes a rotor position detector for detecting a position of the first rotor; an energization controller for carrying out energization control of the motor by converting the motor into an equivalent circuit based on a two-phase DC rotating coordinate system composed of a d-axis in the direction of a magnetic flux of a field of the motor and a q-axis, which is orthogonal to the d-axis, on the basis of a position of the first rotor, and by controlling the amount of energization of an armature of each axis in the equivalent circuit; a current detector for detecting a current flowing through an armature of the motor; an angular velocity detector for detecting an angular velocity of the motor; an induced voltage constant calculator for calculating an induced voltage constant of the motor on the basis of the converted values of a voltage between the terminals of the armature of the motor and a current flowing through the armature in the equivalent circuit and the angular velocity of the motor; and a current command value determiner for determining a command value of the amount of energization of the armature disposed on the d-axis and a command value of the amount of energization of an armature disposed on the q-axis in the equivalent circuit in the energization control of the motor by the energization controlling means on the basis of the induced voltage constant of the motor calculated by the induced voltage constant calculator and a command value of an output torque.

With this arrangement, in the case where a rotor phase difference of the motor is changed, the magnetic flux of a field of the motor changes accordingly, causing a change in the induced voltage constant of the motor. An output torque of the motor is proportional to the amount of energization and an induced voltage constant, so that the amount of energization required for outputting a predetermined torque from the motor changes as the induced voltage constant changes. Hence, the current command value determiner determines the command values of the amounts of energization of the armature disposed on the d-axis and the armature disposed on the q-axis, respectively, on the basis of the induced voltage constant of the motor calculated by the induced voltage constant calculator and the command value of the output torque, thus making it possible to set an appropriate amount of energization for a particular changed state of fields of the motor.

Preferably, the controller for a motor includes a field weakening current corrector for correcting the amount of energization of the armature disposed on the d-axis so as to reduce a shortage in field weakening, which his accomplished by changing the rotor phase difference, on the basis of a difference between a command value of the rotor phase difference determined by the rotor phase difference command value determiner and an estimated value of the rotor phase difference estimated by the rotor phase difference estimator.

With this arrangement, in the case where a follow-up delay of the rotor phase difference changer with respect to a command value of the rotor phase difference has caused a difference between the command value and the estimated value of the rotor phase difference, then the field weakening current corrector corrects the amount of energization of the armature disposed on the d-axis so as to reduce the shortage in the field weakening accomplished by changing the rotor phase difference. Thus, in the case where a sudden change of a field weakening level that cannot be coped with by the field weakening accomplished by changing the rotor phase difference is required, this requirement can be met by changing the amount of energization of the armature disposed on the d-axis.

Further, the controller for a motor includes a field weakening current corrector for correcting the amount of energization of the armature disposed on the d-axis so as to reduce a shortage in field weakening, which is accomplished by changing the rotor phase difference, in the case where a command value of the rotor phase difference determined by the rotor phase difference command value determiner exceeds a range of changing the rotor phase difference by the rotor phase difference changer.

With this arrangement, in the case where a changed value of the rotor phase difference based on a command value of the rotor phase difference is large and exceeds the range of changing the rotor phase difference by the rotor phase difference changer, then the field weakening current corrector corrects the amount of energization of the armature on the d-axis so as to reduce a shortage in field weakening, which is accomplished by changing the rotor phase difference. This makes it possible to expand a field weakening setting range to an extent at which field weakening cannot be accomplished by changing the rotor phase difference, thus permitting an expansion of the operating range of the motor.

DESCRIPTION OF THE PREFERRED EMBODIMENTS

Figure 1:
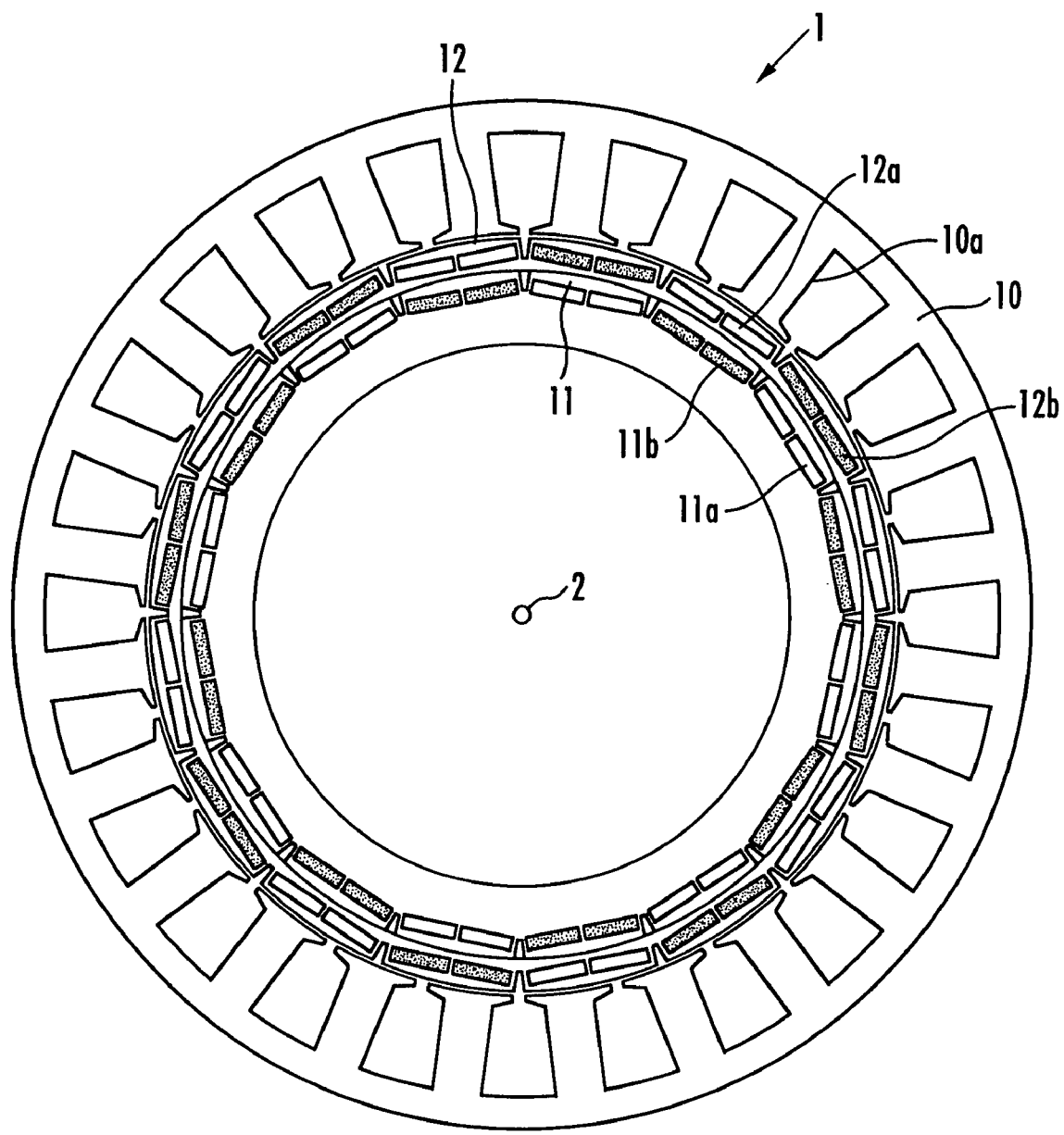
FIG. 1 is a configuration diagram of a DC brushless motor provided with a double rotor.
Figure 2:
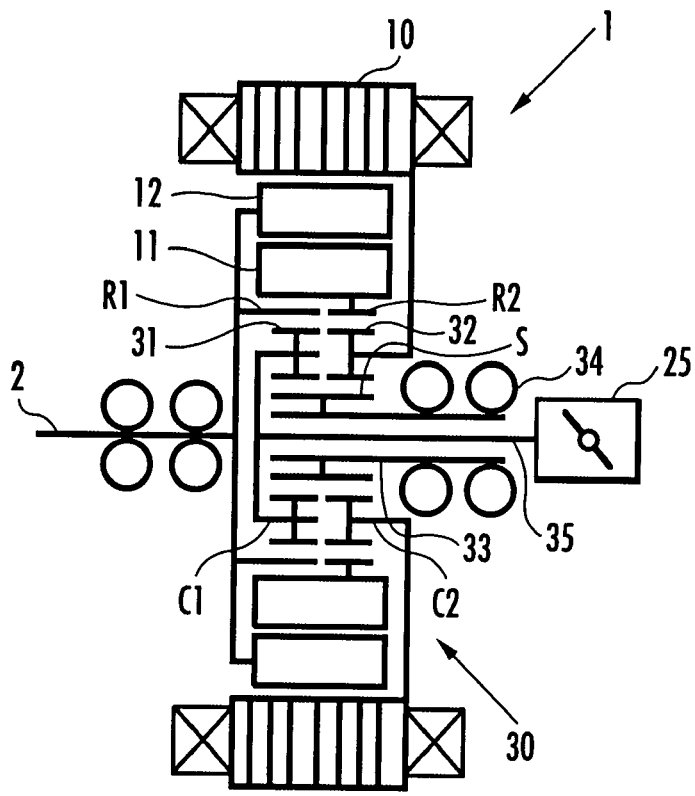
FIGS. 2(a) and 2(b) are a configuration diagram and an operation explanatory diagram, respectively, of a mechanism for changing a phase difference between an outer rotor and an inner rotor of the DC brushless motor shown in FIG. 1.
Figure 2:
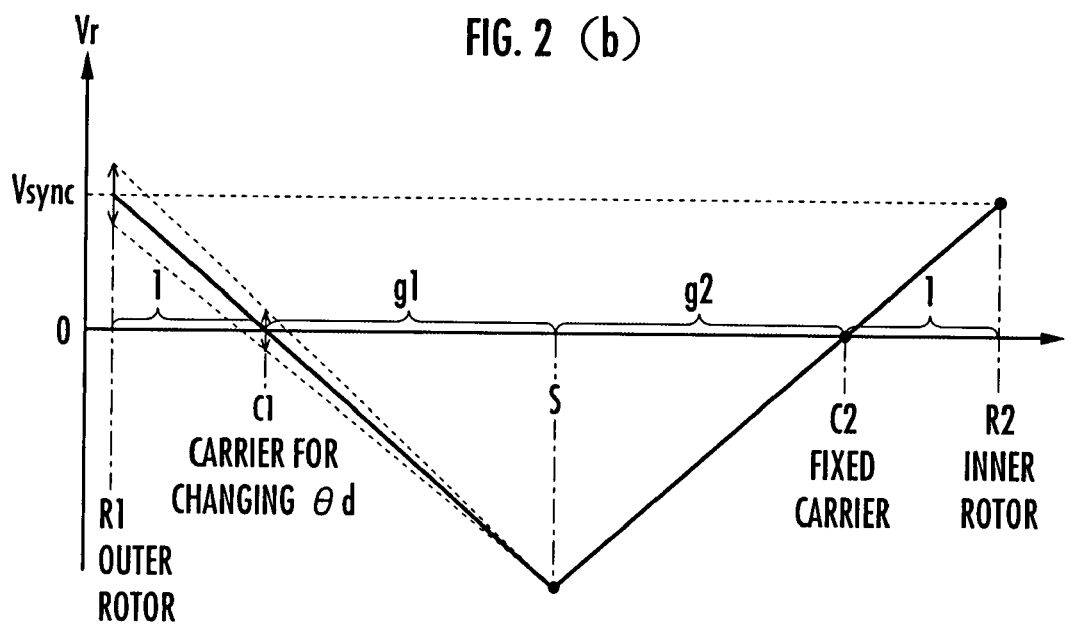
Figure 3:
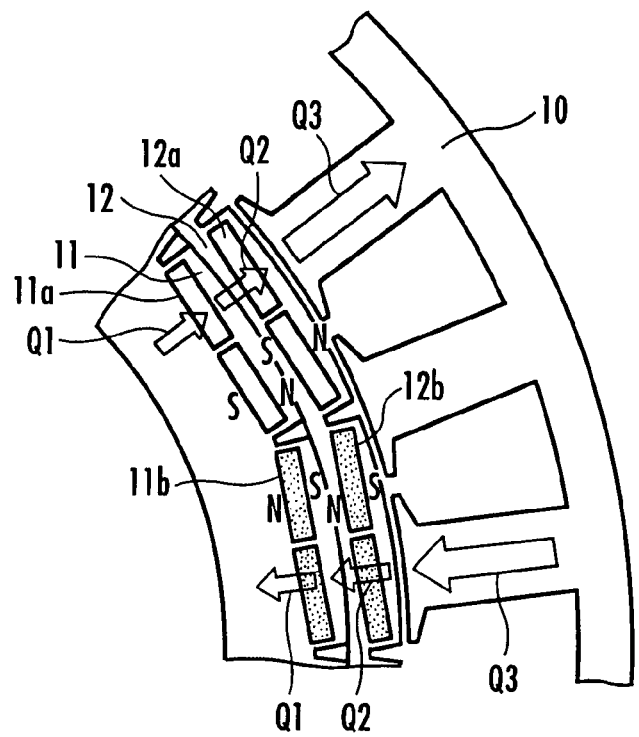
FIGS. 3(a) and 3(b) are explanatory diagrams of advantages provided by changing the phase difference between the outer rotor and the inner rotor.
Figure 3:
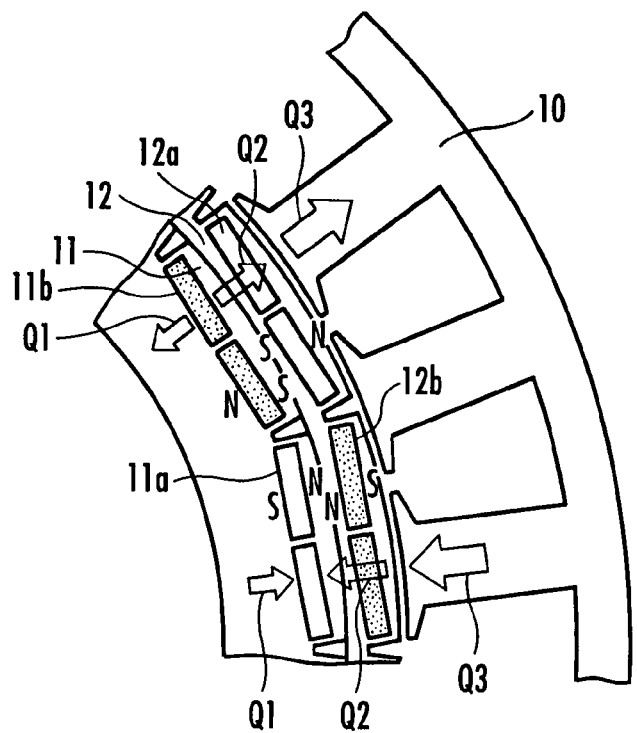
Figure 4:
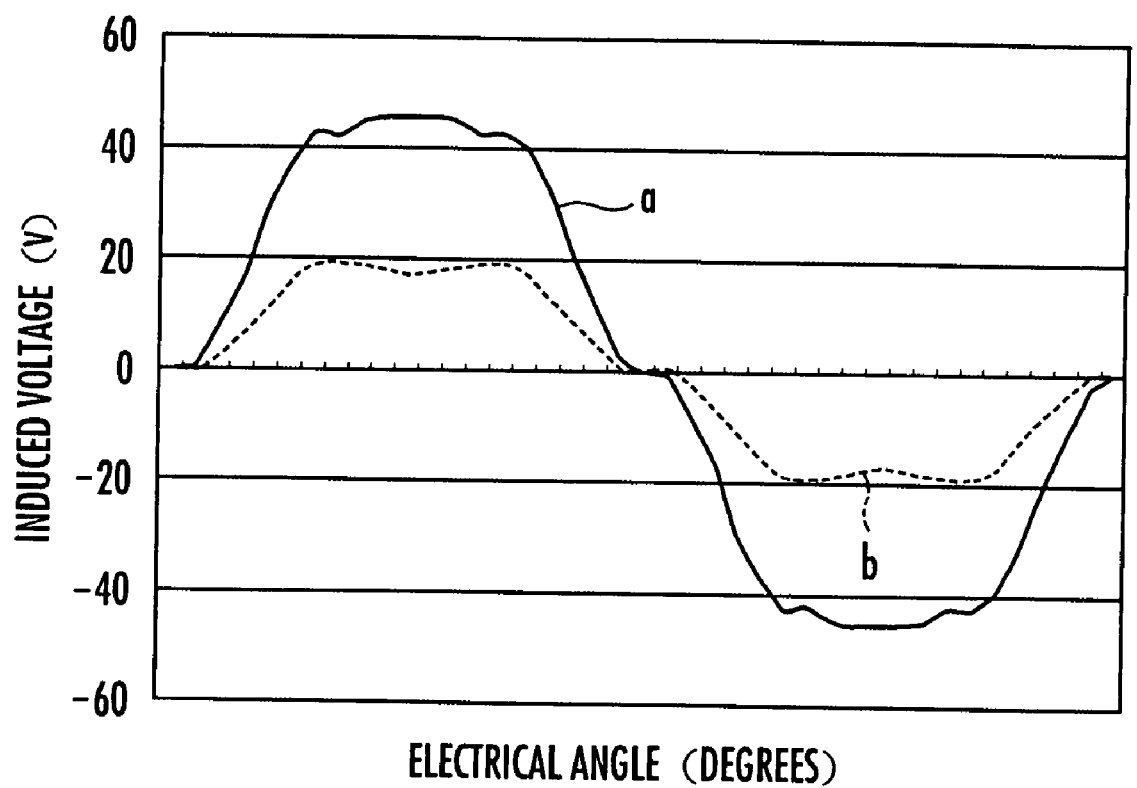
FIG. 4 is an explanatory diagram of the advantages provided by changing the phase difference between the outer rotor and the inner rotor.
Figure 5:
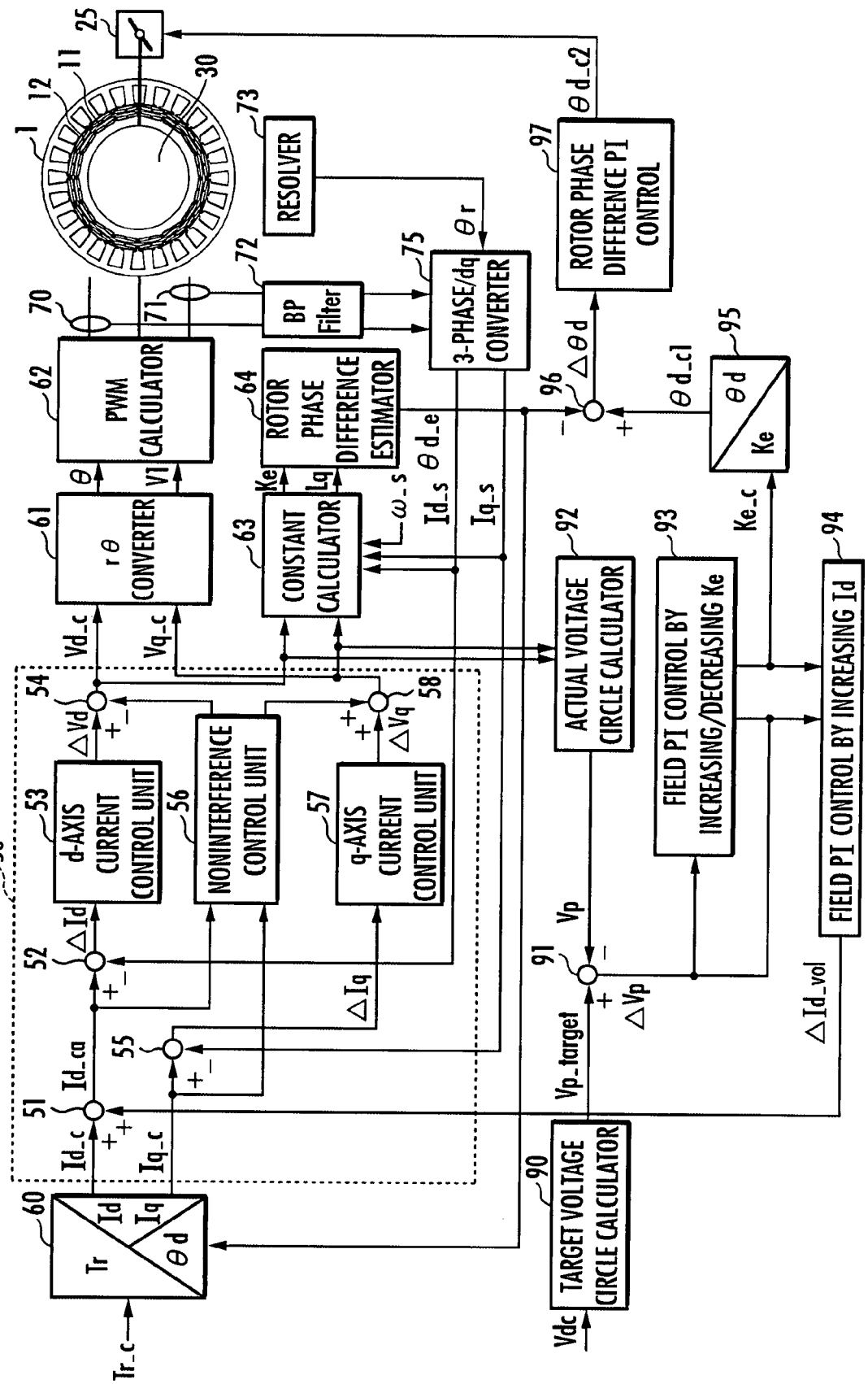
FIG. 5 is a control block diagram of a controller for a motor.
Figure 6:
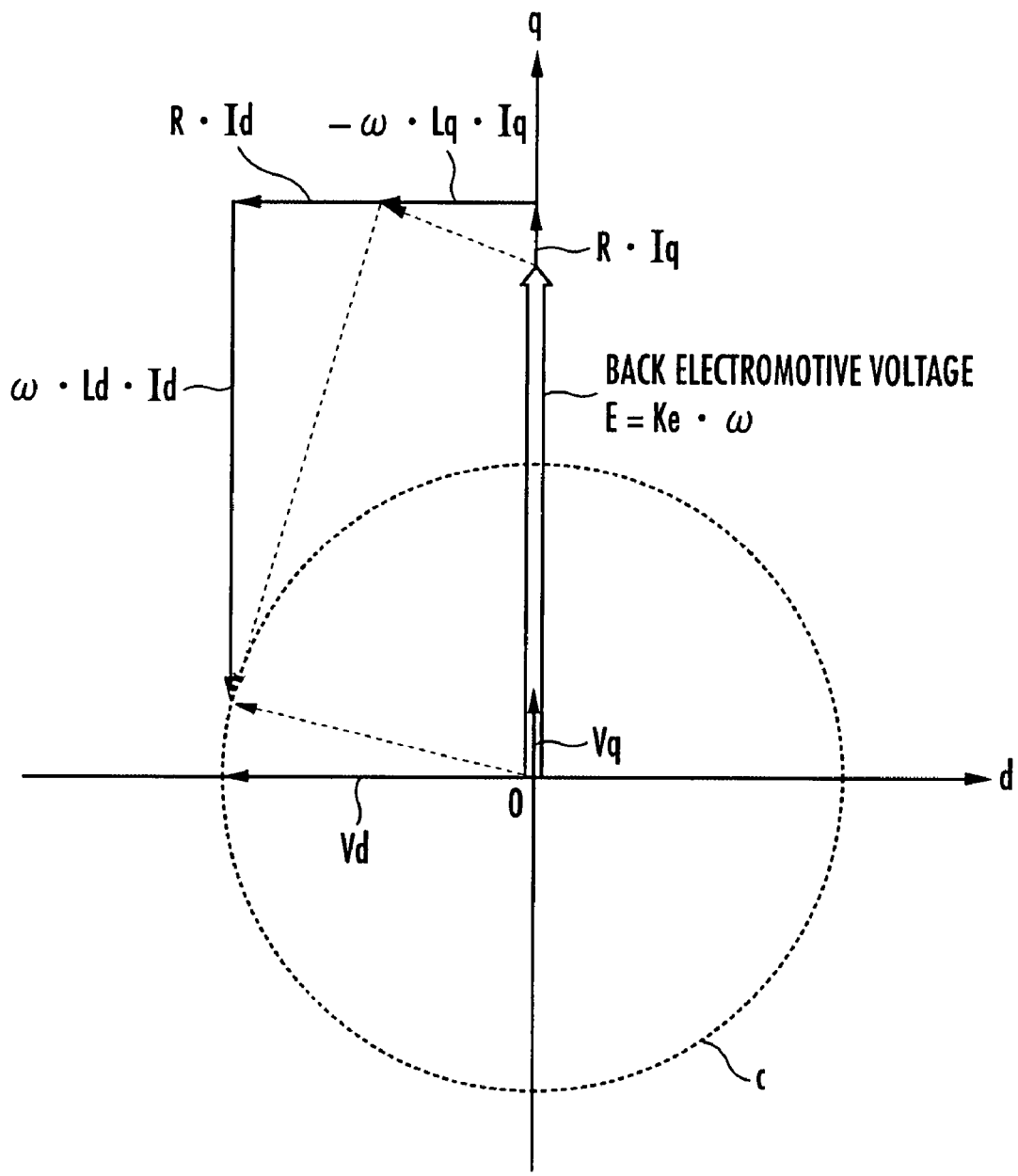
FIG. 6 is a voltage vector diagram in a d-q coordinate system.
Figure 7:
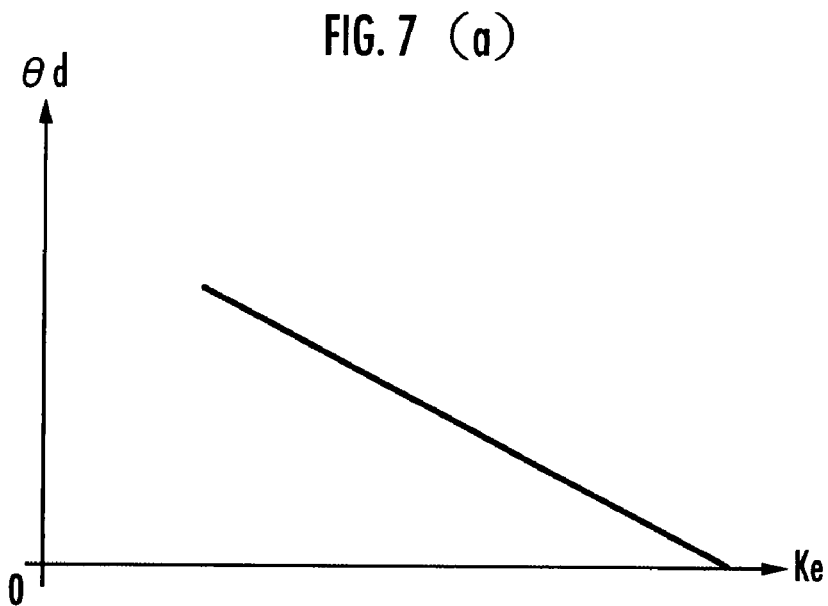
FIG. 7(a) is an explanatory diagram of a map for determining a rotor phase difference from an induced voltage constant.
FIG. 7(b) is a map for determining a rotor phase difference from an induced voltage constant and an inductance of a q-axis armature.
Figure 7:
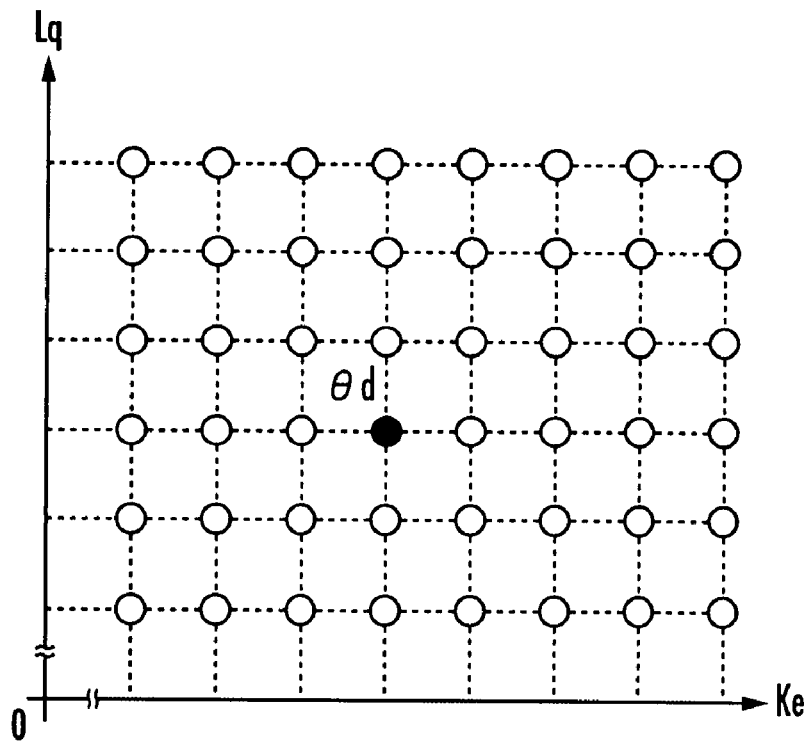
Figure 8:
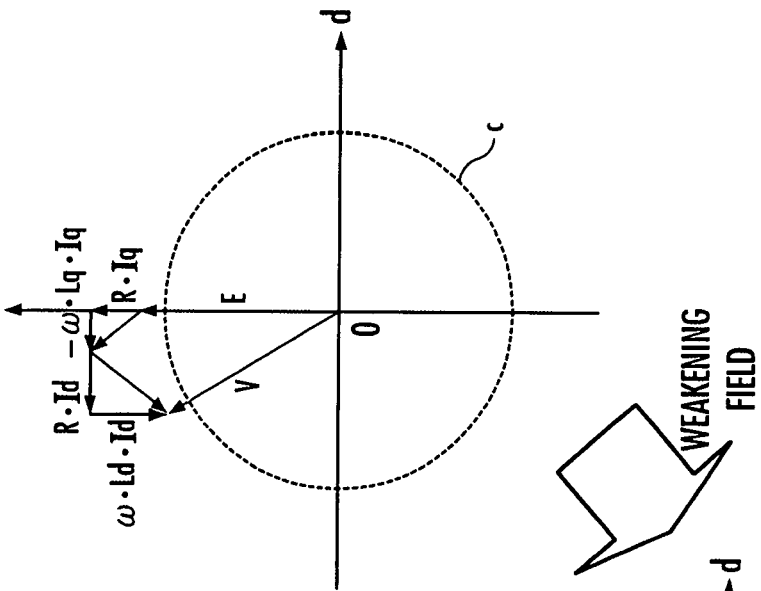
FIGS. 8(a), 8(b) and 8(c) are explanatory diagrams of advantages obtained by field weakening and field strengthening.
Figure 8:
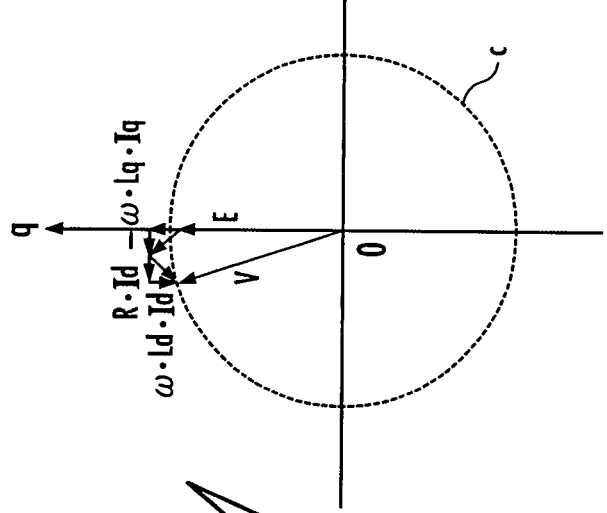
Figure 8:
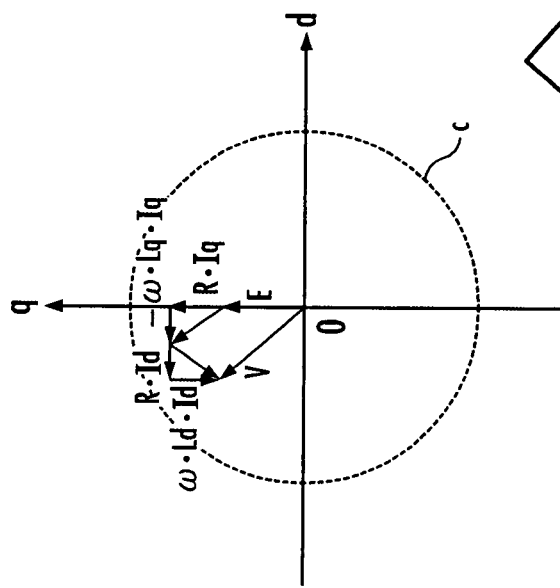
Figure 9:
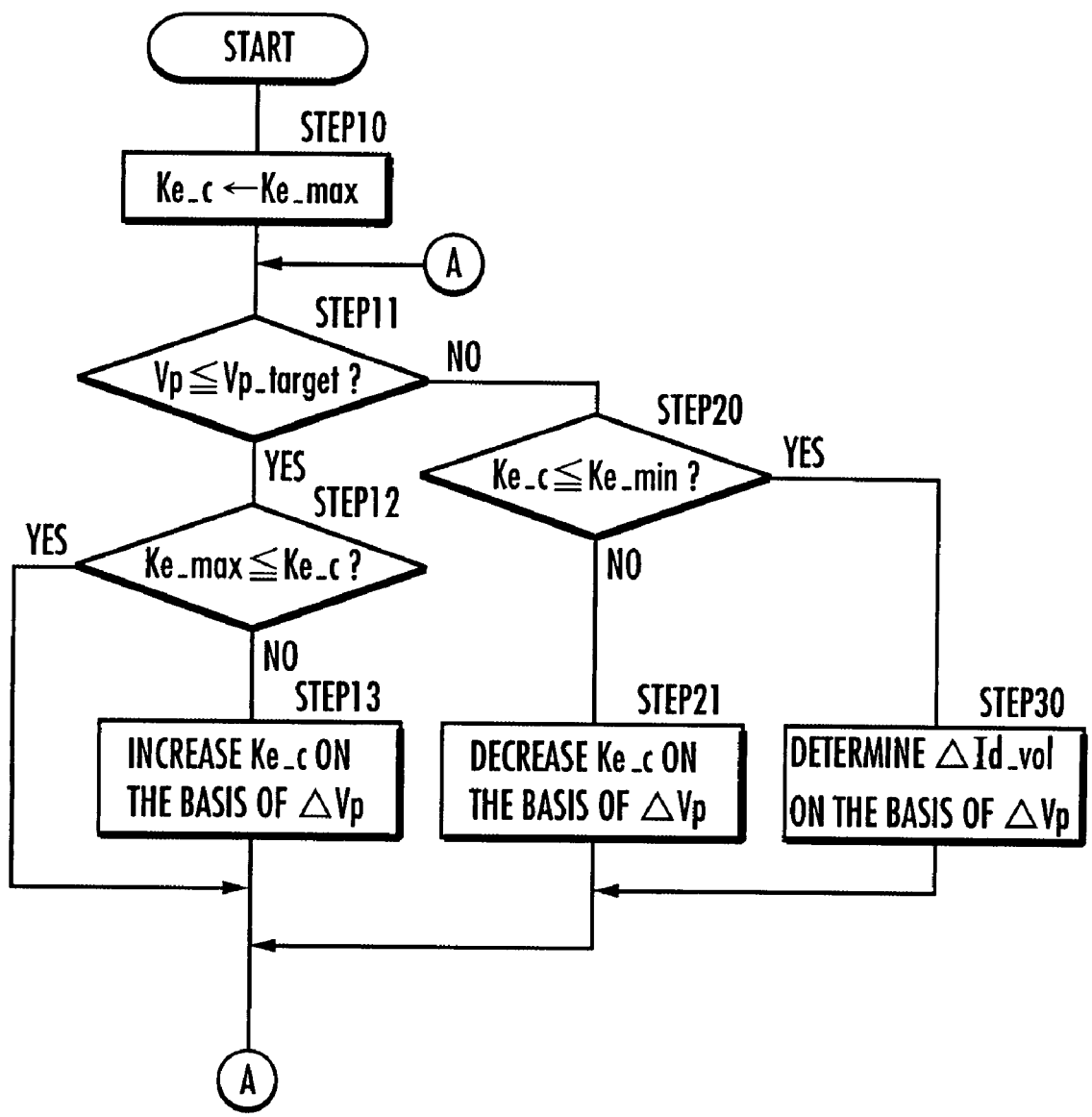
FIG. 9 is a flowchart of processing for bringing a phase voltage of a motor close to a target voltage circle.
Figure 10:
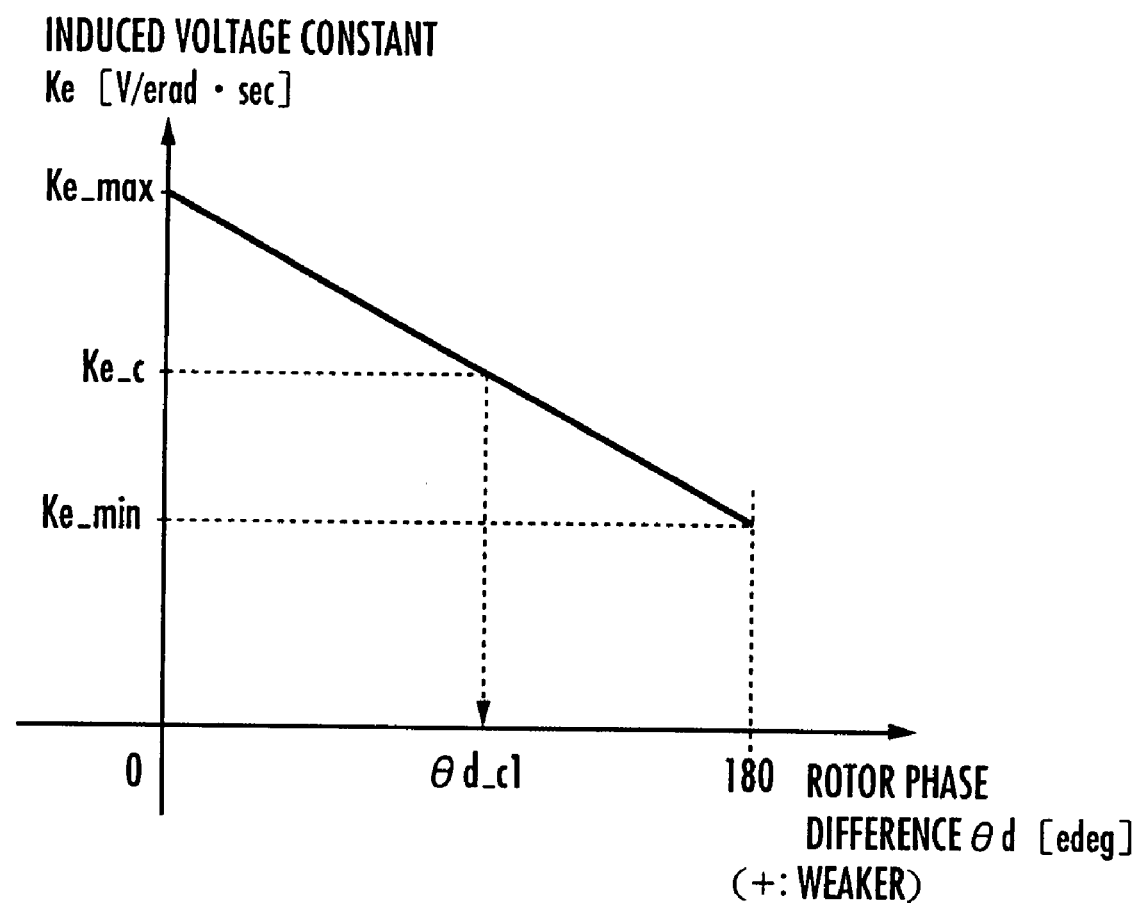
FIG. 10 is an explanatory diagram of a map for determining a rotor phase difference from an induced voltage constant.
Figure 11:
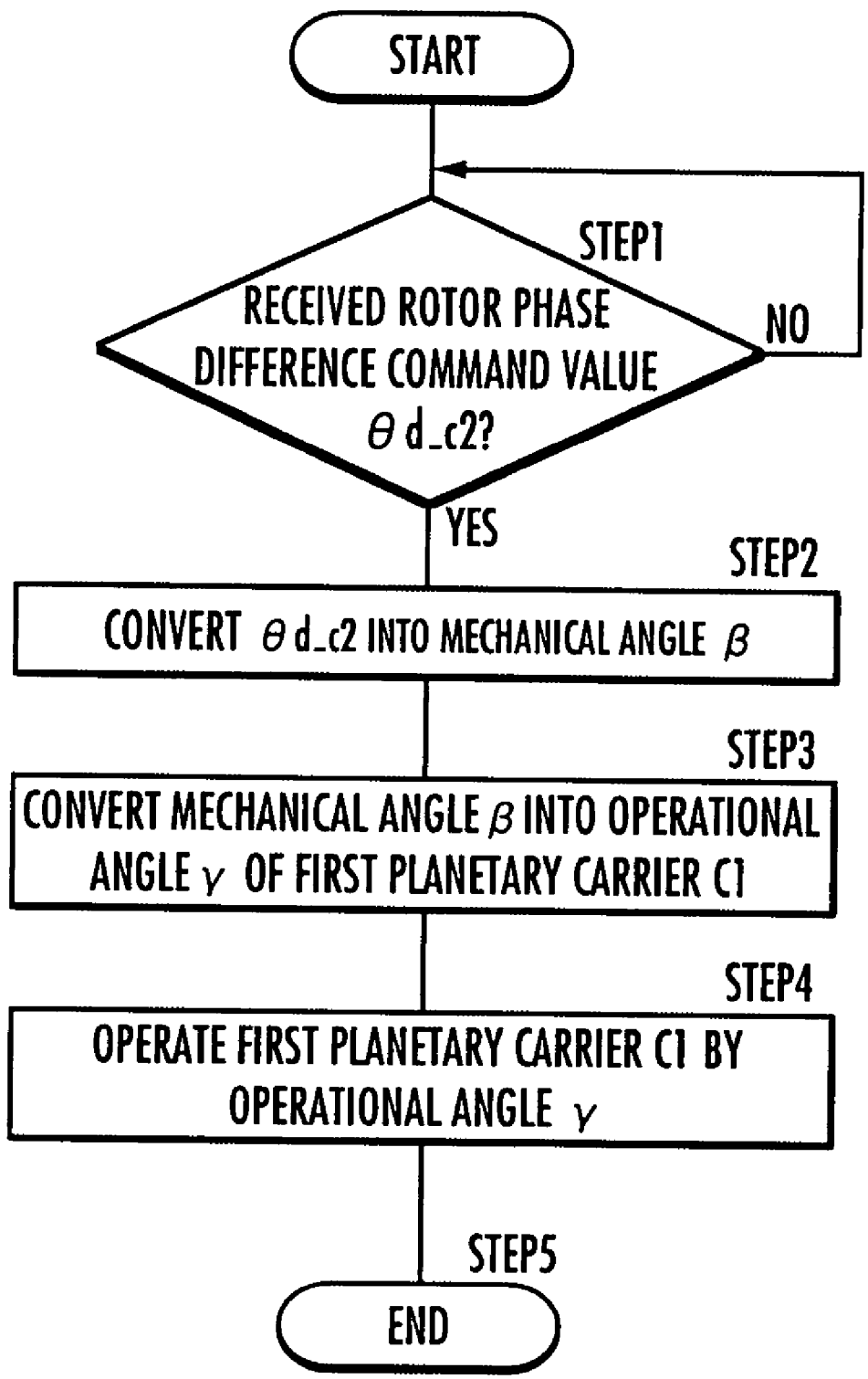
FIG. 11 is a flowchart of the processing for changing a rotor phase difference by an actuator.
Figure 12:
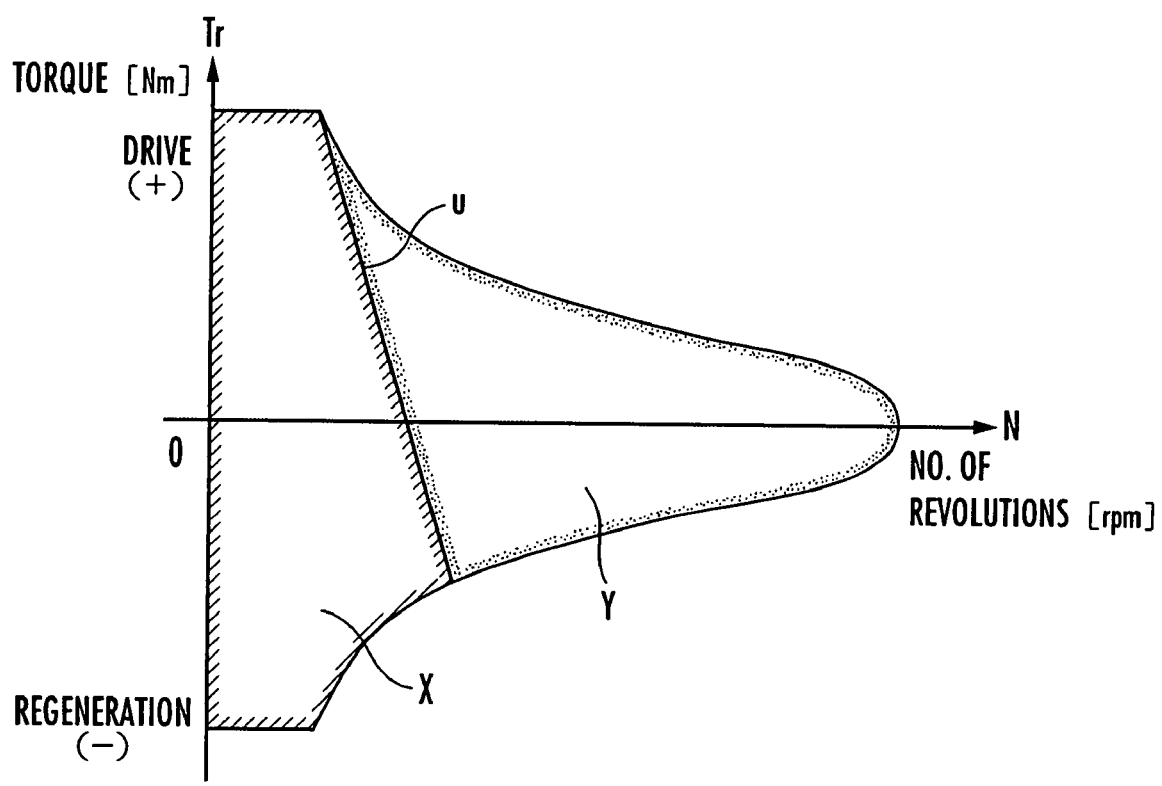
FIG. 12 is an explanatory diagram showing a range in which field weakening in the motor is required.

An embodiment of the present invention will be explained with reference to FIG. 1 to FIG. 11. FIG. 1 is a configuration diagram of a DC brushless motor provided with a double rotor, FIGS. 2(a) and 2(b) are a configuration diagram and an operation explanatory diagram, respectively, of a mechanism for changing a phase difference between an outer rotor and an inner rotor of the DC brushless motor shown in FIG. 1, FIG. 3 and FIG. 4 are explanatory diagrams of advantages provided by changing the phase difference between the outer rotor and the inner rotor, FIG. 5 is a control block diagram of a controller for a motor, FIG. 6 is a voltage vector diagram in a d-q coordinate system, FIG. 7 shows explanatory diagrams of a map for determining a rotor phase difference from an induced voltage constant and a map for determining a rotor phase difference from an induced voltage constant and an inductance of a q-axis armature, FIG. 8 shows explanatory diagrams of advantages of field weakening and field strengthening, FIG. 9 is a flowchart of processing for bringing a phase voltage of a motor close to a target voltage circle, FIG. 10 is an explanatory diagram of a map for determining a rotor phase difference from an induced voltage constant, and FIG. 11 is a flowchart of the processing for changing a rotor phase difference by an actuator.

Referring to FIG. 1, a motor 1 in the present embodiment is a DC brushless motor equipped with an inner rotor 11 (corresponding to a second rotor in the present invention) having fields of permanent magnets 11a and 11b disposed at equal intervals in the circumferential direction, an outer rotor 12 (corresponding to a first rotor in the present invention) having fields of permanent magnets 12a and 12b disposed at equal intervals in the circumferential direction, and a stator 10 having an armature 10a for producing a rotary field in relation to the inner rotor 11 and the outer rotor 12. The motor 1 is used as a driving source of, for example, a hybrid vehicle or an electric-powered vehicle, and operates as a motor and a generator when mounted in a hybrid vehicle.

The inner rotor 11 and the outer rotor 12 are concentrically disposed such that the rotating shafts thereof are both coaxial with a rotating shaft 2 of the motor 1. In the inner rotor 11, the permanent magnets 11a having their north poles facing the rotating shaft 2 and permanent magnets 11b having their south poles facing the rotating shaft 2 are alternately disposed. Similarly, in the outer rotor 12, the permanent magnets 12a having their north poles facing the rotating shaft 2 and the permanent magnets 12b having their south poles facing the rotating shaft 2 are alternately disposed.

The motor 1 further includes a planetary gear mechanism 30 shown in FIG. 2(a) to change a rotor phase difference, which is a phase difference between the outer rotor 12 and the inner rotor 11. Referring to FIG. 2(a), the planetary gear mechanism 30 is a single-pinion planetary gear mechanism disposed in a hollow portion of the inner rotor 11 on the inner circumferential side thereof. The planetary gear mechanism 30 includes a first ring gear R1 coaxially and integrally formed with the outer rotor 12, a second ring gear R2 coaxially and integrally formed with the inner rotor 11, a first planetary gear 31 engaging with the first ring gear R1, a second planetary gear 32 engaging with the second ring gear R2, a sun gear S, which is an idle gear engaging with the first planetary gear 31 and the second planetary gear 32, a first planetary carrier C1 which rotatively supports the first planetary gear 31 and which is rotatively supported by the rotating shaft 2, and a second planetary carrier C2 which rotatively supports the second planetary gear 32 and which is secured to the stator 10.

In the planetary gear mechanism 30, the first ring gear R1 and the second ring gear R2 have approximately the same gear configuration, and the first planetary gear 31 and the second planetary gear 32 have approximately the same gear configuration. The rotating shaft 33 of the sun gear S is coaxially disposed with the rotating shaft 2 of the motor 1 and rotatively supported by a bearing 34. Thus, the planetary gear mechanism 30 is configured such that the first planetary gear 31 and the second planetary gear 32 engage with the sun gear S, and the outer rotor 12 and the inner rotor 11 rotate in synchronization.

Further, a rotating shaft 35 of the first planetary carrier C1 is coaxially disposed with the rotating shaft 2 of the motor 1 and connected to an actuator 25. The second planetary carrier C2 is secured to the stator 10.

The actuator 25 hydraulically causes the first planetary carrier C1 to rotate in a forward direction or a reverse direction or restricts the rotation of the first planetary carrier C1 about the rotating shaft 2 in response to a control signal input from an external source. Then, as the first planetary carrier C1 is rotated by the actuator 25, a relative positional relationship (phase difference) between the outer rotor 12 and the inner rotor 11 changes. The planetary gear mechanism 30 and the actuator 25 constitute the rotor phase difference changer in the present invention. The actuator 25 may be an actuator that electrically rotates the first planetary carrier C1 rather than hydraulically.

FIG. 2(b) shows a relationship among the rotational velocities of the first ring gear R1, the first planetary carrier C1, the sun gear S, the second planetary carrier C2, and the second ring gear R2 in the planetary gear mechanism 30, the axis of ordinates indicating a rotational velocity Vr.

Referring to FIG. 2(b), the velocity of the second planetary carrier C2 secured to the stator 10 is zero. This means that, for example, when the sun gear S rotates in the reverse direction (Vr<0), the second ring gear R2 and the inner rotor 11 rotate in the forward rotational direction (Vr>0) at a velocity based on a gear ratio g2 of the sun gear S relative to the second ring gear R2.

In the case where the actuator 25 is in non-operation state (in the case where the first planetary carrier C1 is not being rotated by the actuator 25), then the rotational velocity of the first planetary carrier C1 is zero. Hence, the first ring gear R1 and the outer rotor 12 rotate in the reverse direction relative to the rotating sun gear S at a velocity based on the gear ratio g1 of the sun gear S relative to the first ring gear R1. The gear ratio g1 and a gear ratio g2 are set to be approximately the same (g1≈g2), so that the inner rotor 11 and the outer rotor 12 rotate in synchronization, thus maintaining the phase difference between the inner rotor 11 and the outer rotor 12 at a constant value.

In the case where the actuator 25 is in operation state (in the case where the first planetary carrier C1 is being rotated by the actuator 25), then the first ring gear R1 and the outer rotor 12 rotate in the reverse direction relative to the rotating sun gear S at a velocity obtained by increasing or decreasing a velocity based on the gear ratio g1 of the sun gear S relative to the first ring gear R1 by the rotational amount of the first planetary carrier C1. This changes the phase difference between the outer rotor 12 and the inner rotor 11.

The actuator 25 is constructed so as to be capable of rotating the first planetary carrier C1 in the forward direction or the reverse direction by at least a mechanical angle β (degrees)= $(180/P) \times g1/(1+g1)$ relative to the gear ratio g1 of the sun gear S with respect to the first ring gear R1 and the number of pairs of poles P of the motor 1.

Therefore, the phase difference between the outer rotor 12 and the inner rotor 11 can be changed toward an advance angle or a delay angle within the range of at least 180 degrees in terms of electrical angle. In this case, the motor 1 can be set, as appropriate, between a field-weakening mode wherein the permanent magnets 12a and 12b of the outer rotor 12 and the permanent magnets 11a and 11b of the inner rotor 11 are disposed with the same poles thereof opposing each other and a field-strengthening mode wherein the permanent magnets 12a and 12b of the outer rotor 12 and the permanent magnets 11a and 11b of the inner rotor 11 are disposed with opposite poles thereof opposing each other.

FIG. 3(a) shows the field-strengthening mode. The directions of magnetic fluxes Q2 of the permanent magnets 12a and 12b of the outer rotor 12 and the directions of magnet fluxes Q1 of the permanent magnets 11a and 11b of the inner rotor 11 are the same, leading to a large composite magnetic fluxes Q3. Meanwhile, FIG. 3(b) shows the field-weakening mode. The directions of the magnetic fluxes Q2 of the permanent magnets 12a and 12b of the outer rotor 12 and the directions of the magnet fluxes Q1 of the permanent magnets 11a and 11b of the inner rotor 11 are opposite to each other, causing the composite magnetic fluxes Q3 to be smaller.

FIG. 4 shows a graph comparing induced voltages produced in the armature of the stator 10 when the motor 1 is run at a predetermined number of revolutions in the mode shown in FIG. 3(a) and in the mode shown in FIG. 3(b), respectively, the axis of ordinates indicating induced voltage (V) and the axis of abscissas indicating electrical angle (degrees). In the graph, "a" denotes the mode shown in FIG. 3(a)(the field strengthening mode), while "b" denotes the mode shown in FIG. 3(b)(the field weakening mode). FIG. 4 shows that changing the phase difference between the outer rotor 12 and the inner rotor 11 causes a significant change in an induced voltage that is generated.

Thus, the induced voltage constant Ke of the motor 1 can be changed by increasing or decreasing the magnetic fluxes of the fields by changing the phase difference between the outer rotor 12 and the inner rotor 11. This makes it possible to expand an operative range relative to outputs and the numbers of revolutions of the motor 1, as compared with a case where the induced voltage constant Ke is fixed. Moreover, the operating efficiency of the motor 1 can be enhanced, because the copper loss of the motor 1 reduces, as compared with a case where the field weakening control is conducted by energizing the armature disposed on the d-axis (field axis) by d-q coordinate conversion, which is commonly used for controlling a motor.

Referring now to FIG. 5 to FIG. 11, the controller for a motor in accordance with the present invention will be explained. The controller for a motor shown in FIG. 5 (hereinafter referred to simply as "the controller") converts the motor 1 into an equivalent circuit based on a two-phase DC rotating coordinate system in which the direction of field is indicated by the d-axis, while the direction that is orthogonal to the d-axis is indicated by the q-axis. The controller controls the amount of energization of the motor 1 such that torque based on a torque command value Tr_c received from an external source is output from the motor 1.

The controller is an electronic unit composed of a CPU, memories and the like, and includes a current command value determiner 60 (corresponding to the current command value determining means in the present invention) which determines a command value Id_c of a current to be supplied to the armature on the d-axis (hereinafter referred to as "the d-axis current" and "the d-axis armature," respectively) and a command value Iq_c of a current to be supplied to the armature on the q-axis (hereinafter referred to as "the q-axis current" and "the q-axis armature," respectively) on the basis of a torque command value Tr_c and an estimated value θd_e of the phase difference between the outer rotor 12 and the inner rotor 11 (rotor phase difference) of the motor 1, a three-phase/dq converter 75 which calculates a d-axis current detection value Id_s and a q-axis current detection value Iq_s by three-phase/dq conversion on the basis of current detection signals which are detected by current sensors 70 and 71 (corresponding to the current detecting means in the present invention) and from which unwanted components have been removed by a band-pass filter 72 and a rotor angle θr of the outer rotor 12 detected by a resolver 73 (corresponding to the rotor position detecting means in the present invention), an energization control unit 50 (corresponding to the energization controlling means in the present invention) which determines a command value Vd_c of a voltage between the terminals of the d-axis armature (hereinafter referred to as "the d-axis voltage") and a command value Vq_c of a voltage between the terminals of the q-axis armature (hereinafter referred to as "the q-axis voltage") such that a difference ΔId between the command value Id_c and the detection value Id_s of the d-axis current and a difference ΔIq between the command value Iq_c and the detection value Iq_s of the q-axis current are reduced, an rθ converter 61 which converts the command value Vd_c of the d-axis voltage and the command value Vq_c of the q-axis voltage into components of a magnitude V1 and an angle θ, and a PWM calculator 62 which converts the components of the magnitude V1 and the angle θ into a three-phase (U, V, W) AC voltage by PWM control, the PWM calculator 62 including a function of the inverter circuit in the present invention.

The controller is further equipped with a constant calculator 63 (including the function of the induced voltage constant calculating means in the present invention) which calculates the induced voltage constant Ke of the motor 1 and the inductance Lq of the q-axis armature on the basis of the d-axis voltage command value Vd_c, the q-axis voltage command value Vq_c, the d-axis current detection value Id_s, the q-axis current detection value Iq_s, and an angular velocity detection value ω_s of the motor 1 (detected by an angular velocity detector, which is not shown), a rotor phase difference estimator 64 (corresponding to the rotor phase difference estimating means in the present invention) for determining an estimated value θd_e on the basis of the induced voltage constant Ke and the q-axis armature inductance Lq, a target voltage circle calculator 90 for calculating a radius Vp_target of a target voltage circle, which will be discussed later, from an output voltage Vdc of a DC power source (not shown) supplying DC power to the PWM calculator 62, an actual voltage circle calculator 92 which calculates a radius Vp of an actual voltage circle, which will be discussed later, from a d-axis voltage command value Vd_c and a q-axis voltage command value Vq_c, an induced voltage constant command value determiner 93 which determines a command value Ke_c of an induced voltage constant on the basis of a difference ΔVp between Vp_target and Vp, a field weakening current correction value calculator 94 for calculating a correction value ΔId_vol of a command value Id_c of the d-axis current on the basis of the command value Ke_c of an induced voltage constant and ΔVp, a rotor phase difference acquirer 95 which acquires a rotor phase difference θd_c1 corresponding to the command value Ke_c of an induced voltage constant, and a rotor phase difference command value determiner 97 which determines a rotor phase difference command value θd_c2 on the basis of a difference Δθd between the θd_c1 and the estimated value θd_e of a rotor phase difference.

The field weakening current correction value calculator 94 and an adder 51 which adds the correction value ΔId_vol of a field weakening current to the d-axis current command value Id_c constitute the field weakening current correcting means in the present invention. Further, the target voltage circle calculator 90, a subtractor 91, the actual voltage circle calculator 92, the induced voltage constant command value determiner 93, the rotor phase difference acquirer 95, a subtractor 96, and the rotor phase difference command value determiner 97 constitute the rotor phase difference command value determining means in the present invention.

The energization control unit 50 includes an adder 51 for adding the correction value ΔId_vol to the d-axis current command value Id_c, a subtractor 52 for calculating a difference ΔId between the d-axis current command value Id_ca to which the correction value ΔId_vol has been added and a detection value Id_s of the d-axis current, a d-axis current control unit 53 for calculating a d-axis difference voltage ΔVd for producing the difference ΔId, a noninterference control unit 56 for calculating a component for cancelling the influences of velocity electromotive forces, which interfere with each other between the d-axis and the q-axis, on the basis of the d-axis current command value Id_c and the q-axis current command value Iq_c (noninterference component), a subtractor 54 for subtracting the noninterference component calculated by the noninterference control unit 56 from the d-axis difference voltage ΔVd, a subtractor 55 for calculating the difference ΔIq between the command value Iq_c and the detection value Iq_s of the q-axis current, a q-axis current control unit 57 for calculating a q-axis difference voltage ΔVq for producing the difference ΔIq, and an adder 58 for adding the noninterference component to the q-axis difference voltage ΔVq.

FIG. 6 shows a relationship between current and voltage in the d-q coordinate system, the axis of ordinates indicating the q-axis (torque axis) and the axis of abscissas indicating the d-axis (field axis). In the figure, C denotes a target voltage circle whose radius Vp_target is calculated by the target voltage circle calculator 90. Vp_target is set to, for example, VdcX0.5 or Vdc/6$^{1/2}$ based on a sinusoidal modulation.

The controller controls the rotor phase difference, the d-axis current, and the q-axis current such that the resultant vector V of the voltage Vd between the terminals of the d-axis armature and the voltage Vq between the terminals of the q-axis armature (the magnitude of the resultant vector V providing the radius of an actual voltage circle) traces on the circumference of the target voltage circle C. In the figure, E denotes a back electromotive force generated in the q-axis armature by the revolution of the motor 1, ω denotes an angular velocity of the motor 1, R denotes resistance of the d-axis armature and the q-axis armature, Lq denotes an inductance of the q-axis armature, Ld denotes an inductance of the d-axis armature, Vd denotes a d-axis voltage, Vq denotes a q-axis voltage, Id denotes d-axis current, and Iq denotes q-axis current.

Regarding the components on the q-axis in FIG. 6, the relationship indicated by expression (1) given below holds; therefore, the induced voltage constant Ke of the motor 1 can be calculated from expression (2) given below:

$$Ke \cdot \omega + R \cdot Iq = Vq - \omega \cdot Ld \cdot Id \qquad (1)$$

where Ke: Induced voltage constant; ω: Angular velocity of motor; R: Resistance of q-axis armature and d-axis armature; Iq: q-axis current; Vq: Voltage between terminals of q-axis armature; Ld: Inductance of d-axis armature; and Id: d-axis current.

$$Ke = \frac{Vq - \omega \cdot Ld \cdot Id - R \cdot Iq}{\omega} \qquad (2)$$

Regarding the components on the d-axis in FIG. 6, the relationship indicated by expression (3) given below holds; therefore, the inductance Lq of the q-axis armature can be calculated from expression (4) given below:

$$Vd = R \cdot Id - \omega \cdot Lq \cdot Iq \qquad (3)$$

$$Lq = \frac{R \cdot Id - Vd}{\omega \cdot Iq} \qquad (4)$$

The constant calculator 63 substitutes the q-axis command voltage Vq_c, the angular velocity detection value ω_s of the motor 1, the d-axis current detection value Id_s, and the q-axis current detection value Iq_s into Vq, ω, Id and Iq, respectively, of the above expression (2) to calculate the induced voltage constant Ke. The constant calculator 63 also substitutes the d-axis current detection value Id, the d-axis voltage command value Vd_c, the angular velocity detection value ω_s of the motor 1, and the q-axis current detection value Iq_s into Id, Vd, ω, Iq, respectively, of the above expression (4) to calculate the inductance Lq of the q-axis armature.

The resistances R of the d-axis armature and the q-axis armature in expression (2) and expression (4) shown above take preset fixed values. The inductance Ld of the d-axis armature in expression (2) may take a preset fixed value; however, the inductance Ld of the d-axis armature decreases as a rotor phase difference increases, so that the inductance Ld may take an estimated value that causes the inductance Ld to decrease as the rotor phase difference command value θd_c increases.

Then, the rotor phase difference estimator 64 determines an estimated value θd_e of a rotor phase difference on the basis of the induced voltage constant Ke and the inductance Lq of the q-axis armature calculated by the constant calculator 63. In the case where the rotor phase difference changes, then the induced voltage constant Ke of the motor 1 and the inductance Lq of the q-axis armature change accordingly.

Hence, the rotor phase difference estimator 64 applies the induced voltage constant Ke and the q-axis armature inductance Lq, which have been calculated by the constant calculator 63, to a correspondence map of Ke and Lq/θd shown in FIG. 7(*b*) to obtain an associated phase difference θd, and determines the phase difference θd as the estimated value θd_e of the phase difference between the outer rotor 12 and the inner rotor 11.

The correspondence map of Ke and Lq/θd is prepared on the basis of experimental data or computer simulations and stored in a memory (not shown) beforehand. The induced voltage constant Ke calculated by the constant calculator 63 could be applied to the Ke/θd correspondence map shown in FIG. 7(*a*) to determine θd_e; however, the accuracy of the estimation of a rotor phase difference can be improved by using the inductance Lq of the q-axis armature in addition to the induced voltage constant Ke to determine the estimated value θd_e of a rotor phase difference.

Then, the current command value determiner 60 applies the torque command value Tr_c and the estimated value θd_e of a rotor phase difference to a correspondence map of Tr, θd/Id, and Iq, which has been stored in a memory beforehand, to obtain associated Id and Iq, and determines the obtained Id and Iq as a d-axis current command value Id_c and a q-axis current command value Iq_c, respectively. Thus, using the estimated value θd_e of a rotor phase difference makes it possible to determine the d-axis current command value Id_c and the q-axis current command value Iq_c that reflect an actual change in a magnetic flux of a field of the motor 1. Hence, output torques of the motor 1 can be accurately controlled on the basis of the torque command value Tr_c.

Referring now to FIG. 8, the following will explain advantages obtained by changing a rotor phase difference such that a resultant vector V of a voltage between the terminals of the d-axis armature and a voltage between the terminals of the q-axis voltage traces the circumference of the target voltage circle C.

FIG. 8(*a*) shows a resultant vector V that lies inside the target voltage circle C. In this case, the rotor phase difference is changed in the direction in which the magnetic fluxes of fields are increased, i.e., in the direction for strengthening fields. This increases the induced voltage constant Ke of the motor 1, and the back electromotive force E generated in the q-axis armature increases by the amount equivalent to the increase in the induced voltage constant Ke. As a result, the q-axis current Iq and the d-axis current Id decrease when the resultant vector V moves on the circumference of the target voltage circle C, as shown in FIG. 8(*b*). Hence, a copper loss that occurs in the motor 1 can be decreased.

FIG. 8(*c*) shows a resultant vector V that lies outside the target voltage circle C. In this case, the rotor phase difference is changed in the direction in which the magnetic fluxes of fields are decreased, i.e., in the direction in which fields are weakened. This causes the induced voltage constant Ke of the motor 1 to decrease and the back electromotive force E generated in the q-axis armature to decrease by the amount equivalent to the reduction in the induced voltage constant Ke. As a result, the supply of current from the PWM calculator 62 to the motor 1 is enabled as the resultant vector V moves on the circumference of the target voltage circle C, as shown in FIG. 8(*b*). This makes it possible to expand the operating range of the motor 1.

Implementing the field weakening control by changing the rotor phase difference, as described above, makes it possible to reduce the copper loss occurring in the motor 1, as compared with a case where the field weakening control is implemented by increasing the d-axis current. Furthermore, changing the rotor phase difference such that the resultant vector V traces on the circumference of the target voltage circle C makes it possible to reduce a power loss caused by switching in the PWM calculator 62.

Referring now to the flowchart shown in FIG. 9, the processing for controlling the rotor phase difference and the field weakening current by the controller will be explained. The processing from STEP10 to STEP13 and STEP20 to STEP21 in FIG. 9 is carried out by the induced voltage constant command value determiner 93, and the processing in STEP30 is carried out by the field weakening current correction value calculator 94.

The induced voltage constant command value determiner 93 sets, in STEP10, the initial value of the command value Ke_c of an induced voltage constant to Ke_max, which is a maximum value of an induced voltage constant that can be set by changing a rotor phase difference (a state in which a rotor phase difference is zero in the present embodiment). The initial value of the command value Ke_c of the induced voltage constant may be arbitrarily set within the range from Ke_min, which is a minimum value of an induced voltage constant that can be set by changing a rotor phase difference (a state in which the rotor phase difference is 180 degrees in the present embodiment), to Ke_max.

In the next STEP11, the induced voltage constant command value determiner 93 determines whether a magnitude Vp of the resultant vector V of the d-axis voltage command value Vd_c and the q-axis voltage command value Vq_c calculated by the actual voltage circle calculator 92 ($=\sqrt{(Vd\_c^2+Vq\_c^2)}$), corresponding to the magnitude of the resultant vector of the voltages between the terminals of the armatures of the individual phases of the motor in accordance with the present invention) is not more than the radius Vp_target of the target voltage circle C calculated by the target voltage circle calculator 90.

In the case where Vp is Vp_target or less, then the procedure proceeds to STEP12 wherein the induced voltage constant command value determiner 93 determines whether the induced voltage constant command value Ke_c is Ke_max or more. In the case where the induced voltage constant command value Ke_c is smaller than Ke_max, then the procedure proceeds to STEP13 wherein the induced voltage constant command value determiner 93 carries out proportional integration (PI) processing on a difference ΔVp between Vp_target and Vp calculated by the subtractor 91 so as to determine an updated increased induced voltage constant command value Ke_c. Meanwhile, in the case where the induced voltage constant command value Ke_c is Ke_max or more, then the induced voltage constant cannot be increased any more, so that the procedure branches to STEP11 and the induced voltage constant command value determiner 93 does not carry out the processing of STEP13.

In the case where it is determined in STEP11 that Vp is larger than Vp_target, then the procedure branches to STEP20 wherein the induced voltage constant command value determiner 93 determines whether the induced voltage constant command value Ke_c is Ke_min or less. In the case where the induced voltage constant command value Ke_c is larger than Ke_min, then the procedure proceeds to STEP21 wherein the induced voltage constant command value determiner 93 carries out the PI processing on a difference ΔVp between Vp_target and Vp calculated by the subtractor 91 so as to determine an updated decreased induced voltage constant command value Ke_c.

Meanwhile, in the case where the induced voltage constant command value Ke_c is Ke_min or less, then the induced voltage constant cannot be decreased any more. In this case, therefore, the procedure branches to STEP30 wherein the field weakening current correction value calculator 94 carries out the PI processing on the difference ΔVp between Vp_target and Vp calculated by the subtractor 91 so as to calculate a correction value ΔId_vol for producing the field weakening effect obtained by increasing the d-axis current in addition to the field weakening effect obtained by changing the induced voltage constant command value Ke_c. The procedure then proceeds to STEP11. The induced voltage constant command value determiner 93 and the field weakening current correction value calculator 94 repeat the processing in STEP11 to STEP13, STEP20 to STEP21, and STEP30.

Referring now to FIG. 5, the induced voltage constant command value Ke_c determined by the induced voltage constant command value determiner 93 is output to the rotor phase difference acquirer 95. Then, the rotor phase difference acquirer 95 applies the induced voltage constant command value Ke_c to the Ke/θd map shown in FIG. 10 to acquire a rotor phase difference θd_c1 for Ke_c.

Further, the difference Δθd between the θd_c1 calculated by the subtractor 96 and an estimated value θd_e of the rotor phase difference obtained by the rotor phase difference estimator 64 is supplied to the rotor phase difference command value determiner 97. The rotor phase difference command value determiner 97 carries out the PI processing on Δθd so as to determine a command value θd_c2 of the rotor phase difference.

Then, the actuator 25 executes the processing shown in FIG. 11 to change the rotor phase difference. More specifically, upon receipt of the command value θd_c2 of the rotor phase difference from the rotor phase difference command value determiner 97 in STEP1 of FIG. 11, the actuator 25 converts the θd_c2 into a mechanical angle β in STEP2. Then, in the subsequent STEP3, the actuator 25 converts the mechanical angle β into an operational angle γ of the first planetary carrier C1 and then causes the first planetary carrier C1 to rotate by the operational angle γ in STEP4. Thus, the rotor phase difference is changed by the angle corresponding to the rotor phase difference command value θd_c2, so that the magnetic fluxes of the fields of the motor 1 are changed, thus providing the field strengthening or weakening effect.

In the present embodiment, the processing in STEP11 to STEP13 shown in FIG. 9 has been carried out as the processing for changing the rotor phase difference to increase an induced voltage constant thereby to bring the magnitude Vp of a phase voltage vector close to the radius Vp_target of a target voltage circle, and the processing in STEP20 to STEP21 and STEP30 has been carried out as the processing for bringing the magnitude Vp of a phase voltage vector close to a target voltage circle radius Vp_target by changing the rotor phase difference so as to reduce an induced voltage constant; however, the advantages of the present invention can be obtained also when only either one of the processing is carried out.

Further, in place of the configuration wherein a command value of an induced voltage constant is changed to increase or decrease the magnetic fluxes of fields, the magnetic fluxes of fields may alternatively be increased or decreased by directly changing the rotor phase difference command value θd_c according to the difference ΔVp between the magnitude Vp of the resultant vector of the d-axis voltage command value Vd_c and the q-axis voltage command value Vq_c and the target voltage circle radius Vp_target.

Further, the processing in STEP20 and STEP30 of FIG. 9 has been carried out to weaken the fields by increasing the d-axis current when the phase voltage Vp cannot be reduced to the target voltage circle radius Vp_target by changing an induced voltage constant; however, the advantages of the present invention can be obtained even if such processing is not carried out.

According to the present embodiment, in STEP11 of FIG. 9, the magnitude Vp of the resultant vector V of the d-axis voltage command value Vd_c and the q-axis voltage command value Vq_c has been compared with the target voltage circle radius Vp_target. Alternatively, however, the voltages between the terminals of the armatures of the motor 1 may be detected to calculate the magnitude of the resultant vector of the voltages between the terminals of the individual phases, and the calculated magnitude of the resultant vector (corresponding to the magnitude of the resultant vector of the voltages between the terminals of the armatures of the individual phases of the motor in the present invention) and the target voltage circle radius Vp_target may be compared.

The present embodiment has shown the controller for a motor adapted to handle the motor by converting the motor into an equivalent circuit based on 2-phase DC rotary coordinate system composed of the d-axis and the q-axis. The present invention, however, can be also applied to a controller for a motor adapted to handle the motor by converting the motor into an equivalent circuit based on a 2-phase AC fixed coordinate system composed of an α-axis and β-axis or a controller for a motor adapted to handle a 3-phase AC motor as it is without converting the motor into an equivalent circuit.

What is claimed is:

1. A controller for a motor adapted to control an operation of a permanent magnet field type rotary motor having a first rotor and a second rotor, which have a plurality of fields made of permanent magnets and which are disposed around a rotating shaft, by field control carried out by changing a rotor phase difference as a phase difference between the first rotor and the second rotor, the controller comprising:

an inverter circuit for converting DC power supplied from a DC power source into multiphase AC power to be supplied to an armature of the motor;

a rotor phase difference command value determining means for determining a command value of the rotor phase difference in a direction in which a magnetic flux of a field of the motor increases in the case where the magnitude of a resultant vector of the voltages between the terminals of armatures of individual phases of the motor is smaller than a predetermined voltage that has been set to be not more than an output voltage of the DC power source; and a rotor phase difference changing means for changing the rotor phase difference on the basis of a command value of the rotor phase difference.

2. The controller for a motor according to claim 1, comprising:
a rotor position detecting means for detecting a position of the first rotor;
an energization controlling means for carrying out energization control of the motor by converting the motor into an equivalent circuit based on a two-phase DC rotating coordinate system composed of a d-axis in the direction of a magnetic flux of a field and a q-axis, which is orthogonal to the d-axis, on the basis of a position of the first rotor and by controlling the amount of energization of an armature disposed on each axis in the equivalent circuit;
a current detecting means for detecting a current flowing through an armature of the motor;
an angular velocity detecting means for detecting an angular velocity of the motor;
a rotor phase difference estimating means for estimating the rotor phase difference on the basis of conversion values in the equivalent circuit of the voltages between the terminals of the armatures of the motor and currents flowing through the armatures and an angular velocity of the motor; and
a current command value determining means for determining a command value of the amount of energization of the armature disposed on the d-axis and a command value of the amount of energization of the armature disposed on the q-axis in the equivalent circuit in the energization control of the motor by the energization controlling means on the basis of an estimated value of the rotor phase difference estimated by the rotor phase difference estimating means and a command value of an output torque of the motor.

3. The controller for a motor according to claim 2, comprising a field weakening current correcting means for correcting the amount of energization of the armature disposed on the d-axis so as to reduce a shortage in field weakening, which is accomplished by changing the rotor phase difference, on the basis of a difference between the command value of the rotor phase difference determined by the rotor phase difference command value determining means and the estimated value of the rotor phase difference estimated by the rotor phase difference estimating means.

4. The controller for a motor according to claim 2, comprising a field weakening current correcting means for correcting the amount of energization of the armature disposed on the d-axis so as to reduce a shortage in field weakening, which is accomplished by changing the rotor phase difference, in the case where a command value of the rotor phase difference determined by the rotor phase difference command value determining means exceeds a range of changing the rotor phase difference by the rotor phase difference changing means.

5. The controller for a motor according to claim 1, comprising:
a rotor position detecting means for detecting a position of the first rotor;
an energization controlling means for carrying out energization control of the motor by converting the motor into an equivalent circuit based on a two-phase DC rotating coordinate system composed of a d-axis in the direction of a magnetic flux of a field and a q-axis, which is orthogonal to the d-axis, on the basis of a position of the first rotor, and by controlling the amount of energization of an armature of each axis in the equivalent circuit;
a current detecting means for detecting a current flowing through an armature of the motor;
an angular velocity detecting means for detecting an angular velocity of the motor;
a induced voltage constant calculating means for calculating an induced voltage constant of the motor on the basis of the converted values in the equivalent circuit of a voltage between the terminals of an armature of the motor and a current flowing through the armature and an angular velocity of the motor; and
current command value determining means for determining a command value of the amount of energization of the armature disposed on the d-axis and a command value of the amount of energization of the armature disposed on the q-axis in the equivalent circuit in the energization control of the motor by the energization controlling means on the basis of an induced voltage constant of the motor calculated by the induced voltage constant calculating means and a command value of an output torque.

6. The controller for a motor according to claim 5, comprising a field weakening current correcting means for correcting the amount of energization of the armature disposed on the d-axis so as to reduce a shortage in field weakening, which is accomplished by changing the rotor phase difference, on the basis of a difference between a command value of the rotor phase difference determined by the rotor phase difference command value determining means and an estimated value of the rotor phase difference estimated by the rotor phase difference estimating means.

7. The controller for a motor according to claim 5, comprising a field weakening current correcting means for correcting the amount of energization of the armature disposed on the d-axis so as to reduce a shortage in field weakening, which is accomplished by changing the rotor phase difference, in the case where a command value of the rotor phase difference determined by the rotor phase difference command value determining means exceeds a range of changing the rotor phase difference by the rotor phase difference changing means.

8. A controller for a motor adapted to control an operation of a permanent magnet field type rotary motor having a first rotor and a second rotor, which have a plurality of fields made of permanent magnets and which are concentrically disposed around a rotating shaft, by field control carried out by changing a rotor phase difference as a phase difference between the first rotor and the second rotor, the controller comprising:
an inverter circuit for converting DC power supplied from a DC power source into multiphase AC power to be supplied to an armature of the motor;
a rotor phase difference command value determining means for determining a command value of the rotor phase difference in a direction in which a magnetic flux of a field of the motor decreases in the case where the magnitude of a resultant vector of voltages between the terminals of armatures of individual phases of the motor is larger than a target voltage that has been set to be not more than an output voltage of the DC power source; and
a rotor phase difference changing means for changing the rotor phase difference on the basis of a command value of the rotor phase difference.

9. The controller for a motor according to claim 8, comprising:
a rotor position detecting means for detecting a position of the first rotor;

an energization controlling means for carrying out energization control of the motor by converting the motor into an equivalent circuit based on a two-phase DC rotating coordinate system composed of a d-axis in the direction of a magnetic flux of a field and a q-axis, which is orthogonal to the d-axis, on the basis of a position of the first rotor, and by controlling the amount of energization of an armature of each axis in the equivalent circuit;

a current detecting means for detecting a current flowing through an armature of the motor;

an angular velocity detecting means for detecting an angular velocity of the motor;

a rotor phase difference estimating means for estimating the rotor phase difference on the basis of conversion values in the equivalent circuit of a voltage between the terminals of an armature of the motor and current flowing through the armature and an angular velocity of the motor; and a current command value determining means for determining a command value of the amount of energization of the armature disposed on the d-axis and a command value of the amount of energization of the armature disposed on the q-axis in the equivalent circuit in energization control of the motor by the energization controlling means on the basis of an estimated value of the rotor phase difference estimated by the rotor phase difference estimating means and a command value of an output torque of the motor.

10. The controller for a motor according to claim 9, comprising a field weakening current correcting means for correcting the amount of energization of the armature disposed on the d-axis so as to reduce a shortage in field weakening, which is accomplished by changing the rotor phase difference, on the basis of a difference between a command value of the rotor phase difference determined by the rotor phase difference command value determining means and an estimated value of the rotor phase difference estimated by the rotor phase difference estimating means.

11. The controller for a motor according to claim 9, comprising a field weakening current correcting means for correcting the amount of energization of the armature disposed on the d-axis so as to reduce a shortage in field weakening, which is accomplished by changing the rotor phase difference, in the case where a command value of the rotor phase difference determined by the rotor phase difference command value determining means exceeds a range of changing the rotor phase difference by the rotor phase difference changing means.

12. The controller for a motor according to claim 8, comprising:

a rotor position detecting means for detecting a position of the first rotor;

an energization controlling means for carrying out energization control of the motor by converting the motor into an equivalent circuit based on a two-phase DC rotating coordinate system composed of a d-axis in the direction of a magnetic flux of a field of the motor and a q-axis, which is orthogonal to the d-axis, on the basis of a position of the first rotor, and by controlling the amount of energization of an armature of each axis in the equivalent circuit;

a current detecting means for detecting a current flowing through an armature of the motor;

an angular velocity detecting means for detecting an angular velocity of the motor;

an induced voltage constant calculating means for calculating an induced voltage constant of the motor on the basis of the converted values in the equivalent circuit of a voltage between the terminals of an armature of the motor and current flowing through the armature and the angular velocity of the motor; and a current command value determining means for determining a command value of the amount of energization of the armature disposed on the d-axis and a command value of the amount of energization of an armature disposed on the q-axis in the equivalent circuit in the energization control of the motor by the energization controlling means on the basis of an induced voltage constant of the motor calculated by the induced voltage constant calculating means and a command value of an output torque.

13. The controller for a motor according to claim 12, comprising a field weakening current correcting means for correcting the amount of energization of the armature disposed on the d-axis so as to reduce a shortage in field weakening, which is accomplished by changing the rotor phase difference, on the basis of a difference between a command value of the rotor phase difference determined by the rotor phase difference command value determining means and an estimated value of the rotor phase difference estimated by the rotor phase difference estimating means.

14. The controller for a motor according to claim 12, comprising a field weakening current correcting means for correcting the amount of energization of the armature disposed on the d-axis so as to reduce a shortage in field weakening, which is accomplished by changing the rotor phase difference, in the case where a command value of the rotor phase difference determined by the rotor phase difference command value determining means exceeds a range of changing the rotor phase difference by the rotor phase difference changing means.

* * * * *